Oct. 5, 1965 W. T. FISH, JR 3,209,459
TEMPLATE FOR CUTTING PIPE INSULATION
Filed Sept. 26, 1961

INVENTOR.
WILLIAM T. FISH, JR.
BY

Patented Oct. 5, 1965

3,209,459
TEMPLATE FOR CUTTING PIPE INSULATION
William T. Fish, Jr., Lancaster Township, Lancaster County, Pa., assignor to Armstrong Cork Company, Lancaster, Pa., a corporation of Pennsylvania
Filed Sept. 26, 1961, Ser. No. 140,947
2 Claims. (Cl. 33—174)

This invention relates to templates or sleeve patterns of the type used primarily in cutting lengths of tubular insulation material on an angle for the purpose of fabricating insulating fittings for pipe elbows and like angular shapes. More particularly this invention is concerned with providing a template or sleeve pattern for cutting pipe covering or the like at precise matching angles which is simple, economical and efficient. The sleeve pattern comprises a hollow cylindrical template having angularly cut ends and a transverse cutting and measuring slot located about midway of its length, all of which serve as non-yielding cutting guides which follow the contour of the surface of the pipe covering. This feature is particularly advantageous when used on a non-rigid type pipe covering as it facilitates the accurate marking or cutting of angles thereon by providing supporting means around the entire periphery of the pipe covering resulting in a minimum of flattening out or buckling as cutting pressure is applied.

Devices generally used for the purpose with which this invention is concerned have always had the disadvantages of being clumsy and awkward to use or complicated and not generally usable with any high degree of success by unskilled or semi-skilled persons even when attempting to exercise great care in their use. Marking gauges of the type normally used to indicate the necessary angles to be cut on pipe covering or the like also make it necessary to exercise experienced judgment and care when making the actual cut on the pipe covering. In using the devices heretofore available for this purpose, it was usually necessary when making more than one cut on the same piece of pipe covering to change the position of the piece in order that the cuts could be made at the proper angles with the piece disposed in a convenient working position. Inasmuch as the pipe covering is normally tubular in shape and sometimes flexible in nature, it was heretofore purely a matter of judgment as to whether it was exactly properly positioned with respect to the previous cut. In the use of miter boxes for this purpose, in addition to the above objections, it is required that different size boxes be used when there is a substantial variation in the diameters of the pipe covering to be cut. The handling, transporting, using and storing of such devices is awkward, difficult and time- and space-consuming.

It is an object of this invention to provide an inexpensive template for use in cutting pipe insulation which is simple and practical to use. It is a further object of this invention to provide a non-yielding guide for making angular cuts on pipe covering which makes the operation faster and practically eliminates chances of error. It is a still further object of this invention to provide hollow cylindrical cutting templates which are easy to handle, store and transport. Another object of this invention is to provide a hollow cylindrical template which furnishes support for the covering being cut as well as a cutting guide surface around the entire contour of the circular pipe covering. It is a further object of this invention to provide a hollow cylindrical template having a transverse slot located approximately midway of the length thereof to be used in determining the length of the piece to be cut and to serve as a cutting guide.

With these and other objects in view, the template according to my invention comprises a hollow thin-walled cylinder having angularly cut end portions and a transverse slot located about midway of its length, all adapted to serve as non-yielding guides to be used in cutting a cylindrical article positioned therein, the cuts being made in planes at various angles to the axis of the cylinder.

The invention will be clearly understood after reference to the following detailed specification taken in conjunction with the drawings, wherein FIG. 1 is a plan view of a template of this invention having an article to be cut therein;

Figure 1:
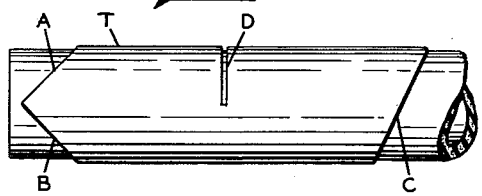
Figure 2:
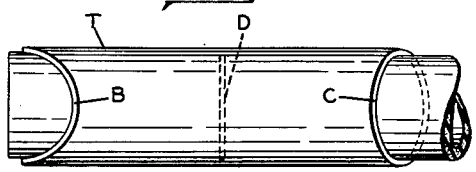
FIG. 2 is a side elevation of FIG. 1.

Referring to FIGS. 1 and 2 of the drawings, the template T comprises a tubular piece which may be formed of sheet metal, rigid plastic such as that formed of polystyrene, acrylonitrile-butadiene-styrene copolymer, glass fiber reinforced polyester, etc., having angularlly cut end portions A, B, and C and a 90° cut D located about midway between the two ends which extends about halfway through the template. The location of the 90° cut D provides a simple and accurate means of achieving uniformity in the lengths of pipe fitting coverings. The diameters and lengths of the templates vary in proportion with the size of the article to be cut. While the templates as shown are cut at 45°, 22½°, and 90°, respectively, with the axis of the cylinder, they may be made at any angle desired.

Figure 3:
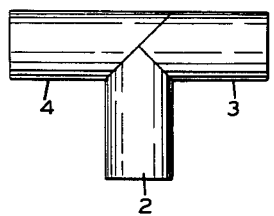
FIG. 3 is an elevational view showing a pipe covering for a T-connection.
Figure 4:
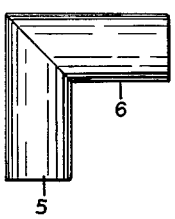
FIG. 4 is an elevational view showing a 90° elbow connection covering made using the template of this invention.
Figure 5:
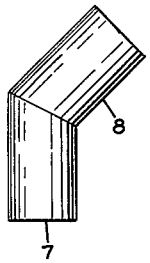
FIG. 5 is an elevational view showing a 45° elbow connection covering made using the template of this invention.
Figure 6:
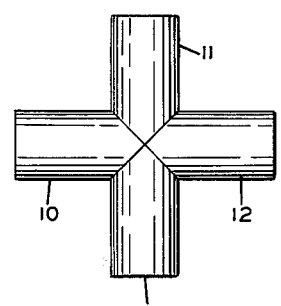
FIG. 6 is an elevational view showing a cross-connection covering made by using the template of this invention.
Figure 7:
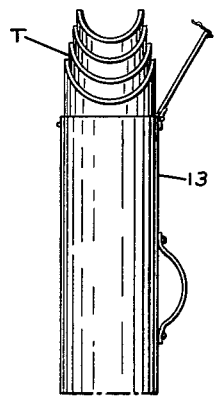
FIG. 7 is an elevational view showing the carrying container for a multiplicity of templates adapted to fit varying diameters of pipe covering.

The T-connection shown in FIG. 3 of the drawings was made by assembling pieces 2 and 3 which were cut using guide portions A, B, and D of the templates together with piece 4 which was cut using guide portions A or B and D of the template. The 90° elbow connection covering shown in FIG. 4 was made by assembling pieces 5 and 6 which were cut using guide portions A and D of the template. The 45° elbow of FIG. 5 was made by assembling pieces 7 and 8 which were cut using guide portions C and D of the template. The cross-connection covering shown in FIG. 6 was made by assembling pieces 9, 10, 11 and 12 which were cut using guide portions A, B and D of the template. As shown in FIG. 7 of the drawings, the templates T may be fit one inside the other and placed in a carrying or storage container 13 when not in use and carried easily from place to place in a compact, lightweight and convenient package.

In use, the hollow cylindrical template of this invention is positioned around a piece of pipe covering to be cut and is usually positioned close to the end thereof. The template and pipe covering are then placed on a supporting surface and held preferably by placing the hand over the template and pipe covering simultaneously to hold them steady while the cut is being made. If cuts are to be made on both sides of the same end of the pipe covering, it is important to note that this may be done easily and with complete assurance that the cuts will be at the desired angles with respect to the axis of the cylinder and with each other without changing the position of the pipe covering with respect to the template. If, however, movement of a template and covering is desired for some reason, this may still be done without fear of being unable to again properly align the pipe covering for making a corresponding cut on the opposite side thereof because of the ease with which the previous angular cut may be aligned with the guide portion of the template. The template not only enables even an unskilled person to make an accurate cut, but since the template is the same shape as the pipe covering, the tendency for coverings made of rubbery, cellular, flexible material to bulge or flatten out under cutting pressure is substantially reduced, enabling a smoother, more accurate cut to be made.

Because the assembled pieces of the pipe covering are usually held together by a fast-drying, very tenacious adhesive, it is very important that the mating surfaces of the cut angles of the pipe covering be as smooth and accurately formed as possible in order that a good joint may be effected with a minimum possibility of error. It is therefore highly advantageous to use a definite rigid guide such as the template of this invention which fits snugly around the contour of the circular face of a pipe covering, providing peripheral support in the case of flexible coverings while cutting pressure is being applied as well as providing a rigid, accurate cutting guide around the entire tubular covering as opposed to the usual marked or scribed line or miter box method of cutting these coverings.

I claim:

1. A cutting guide template comprising a cylindrical non-yielding hollow body of fixed inner diameter having a transverse cutting slot located approximately midway of its length, one end of said body terminating in an angularly cut end portion and the opposite end terminating in a pair of equiangularly cut end portions which meet at the outer extremity of said opposite end, said end portions being adapted to follow the contour of the surface of a cylindrical article to be cut, and to serve as continuous cutting guides.

2. A cutting guide template comprising a cylindrical non-yielding hollow body of fixed inner diameter adapted to receive and fit snugly around the contour of a non-rigid tubular article to be cut, said body terminating at each end in at least one angularly cut portion, at least one of said ends terminating in like diametrically opposed equi-angularly cut portions which make an angle of 90 degrees with each other, said body having a transverse cutting guide slot located approximately midway of its length, said angularly cut portions and said transverse guide slot being adapted to serve as rigid cutting guide portions following the contour of the surface of said article, and said non-yielding hollow body being adapted to suport said non-rigid article to minimize buckling, all to facilitate making accurate multiple cuts thereon, and to divide it midway of its length.

References Cited by the Examiner

UNITED STATES PATENTS

| | | | |
|---|---|---|---|
| 724,185 | 3/03 | Hughes | 33—174 |
| 1,535,980 | 4/25 | Campbell et al. | 33—174 |
| 1,683,953 | 9/28 | Carr | 33—174 |
| 2,155,705 | 4/39 | Gottwald | 33—174 |
| 2,408,517 | 10/46 | Howard | 33—21 |
| 2,422,338 | 6/47 | Christensen | 33—21 |

ISAAC LISANN, *Primary Examiner.*